United States Patent [19]

Redl

[11] 4,304,176

[45] Dec. 8, 1981

[54] APPARATUS FOR THE WET CRUSHING OF MATERIAL

[75] Inventor: Simon Redl, Reichertshausen, Fed. Rep. of Germany

[73] Assignee: Anton Steinecker Maschinenfabrik GmbH, Freising, Fed. Rep. of Germany

[21] Appl. No.: 136,934

[22] Filed: Apr. 3, 1980

[30] Foreign Application Priority Data

Nov. 14, 1979 [DE] Fed. Rep. of Germany ....... 2945976

[51] Int. Cl.[3] ................................................ C12C 7/06

[52] U.S. Cl. ..................................... 99/278; 435/303; 435/306; 426/518; 426/507; 426/28

[58] Field of Search .................... 99/278, 277.2, 277.1, 99/277, 276, 275; 435/302, 303, 306; 426/518, 507, 28, 64

[56] References Cited

U.S. PATENT DOCUMENTS

| | | | |
|---|---|---|---|
| 3,128,189 | 4/1964 | Watts | 99/278 |
| 3,327,612 | 6/1967 | Lenz | 99/278 |
| 3,338,152 | 8/1967 | Lenz | 99/278 |
| 3,450,023 | 6/1969 | Lenz | 99/278 |
| 3,585,045 | 6/1971 | Lenz | 99/276 |
| 3,834,296 | 9/1974 | Kehse | 99/277.2 |

*Primary Examiner*—Robert W. Jenkins

*Attorney, Agent, or Firm*—C. O. Marshall, Jr.

[57] ABSTRACT

Apparatus for supplying material to a wet-crushing mill comprises a storage container for the material, and a rotary feeder arranged below the storage container and forming a bottom closure for the container. At least one device above the rotary feeder is provided for delivering steeping water to the material, and at least one device for removing steeping water from the material comprises a sieve fixedly arranged below the rotary feeder adjacent to the periphery of the feeder. An after-steeping vessel is arranged below the feeder to receive material therefrom.

12 Claims, 3 Drawing Figures

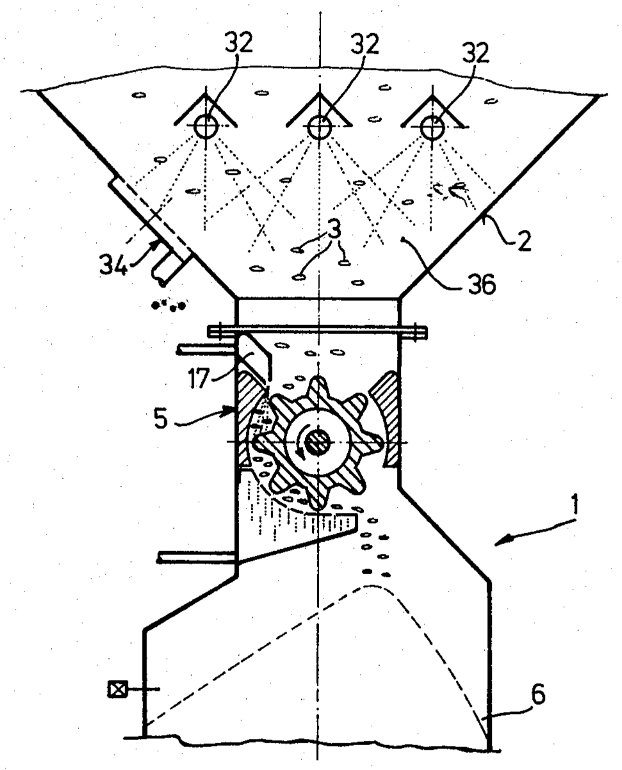
FIG.3
FIG.2
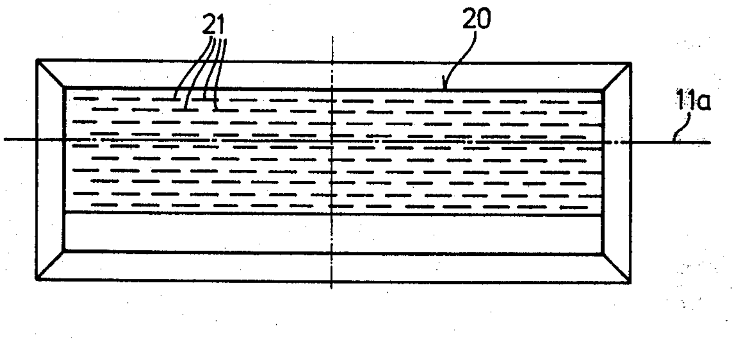

APPARATUS FOR THE WET CRUSHING OF MATERIAL

BACKGROUND OF THE INVENTION

This invention relates to apparatus for the wet crushing of material, particularly malt or barley, comprising a storage container for the material having a rotary feeder forming the lower closure thereof, a crushing mill and means for delivering and removing steeping water for the material to be crushed.

In so-called wet crushing (for preparing the mash in a beer-making process) the material (malt or barley) first has to be steeped in water. The entire quantity of material is supposed to be steeped as uniformly as possible without any inclusions of air so that particularly uniform size-reduction is obtained during the subsequent crushing operation. The glume of the material is supposed to be moistened in such a way that it remains largely intact during the crushing operation.

Hitherto, steeping of the material before wet crushing has generally been carried out in a storage container (malt barrel) arranged above the crushing mill, into which the steeping water is introduced from above or below or which is flooded for the duration of the steeping operation. In these known embodiments, therefore, steeping is carried out in batches. A certain quantity of material is exposed for a certain period to the action of the steeping water in the malt barrel and is subsequently crushed. Accordingly, those quantities of material which are only wet crushed at the end of a batch are exposed to the action of the steeping water (contact liquid) for a much longer period than the quantities crushed immediately after steeping. This gives rise to differences in the composition of the crushed material which adversely affect the subsequent brewing process in various respects.

In another known wet crushing apparatus (German Pat. No. 110,227), a steeping zone is present between the storage container and the crushing mill, the material being continuously passed through this steeping zone by means of mechanical feed systems (for example shafts provided with stirrer arms and blades). Although it is possible with an arrangement such as this to obtain a substantially uniform steeping time for all the particles of material, the feeding mechanism required necessitates a considerable outlay for equipment.

SUMMARY OF THE INVENTION

Accordingly, the object of the present invention is to obviate the above-mentioned disadvantages of the known constructions by providing an apparatus of the type referred to which, with minimal outlay for equipment and limited overall height, enables the material to be uniformly steeped prior to crushing, for an exact period which is adjustable within wide limits.

According to the invention, this object is achieved in that at least one device for the delivery of steeping water is arranged above a rotary feeder, and at least one device for the removal of steeping water is provided below the rotary feeder, containing a sieve fixedly arranged in the lower peripheral region of the rotary feeder, and in that an after-steeping zone is arranged between this rotary feeder and the crushing mill.

In the apparatus according to the invention, therefore, a mechanical closure and delivery unit which is already present and needed in any case, namely the rotary feeder forming the lower closure of a storage container,is used for passing the material for an exact and precisely adjustable period through a steeping zone in which the main steeping process takes place. In the apparatus according to the invention, this main steeping zone is formed by part of the peripheral region of the rotary feeder and, at its lower end, is closed by the sieve fixedly arranged below the rotary feeder. As it moves through this main steeping zone, the material accommodated in the individual compartments of the rotary feeder is brought into uniform, intimate contact with the steeping water and, in this way, is optimally steeped in a time which is exactly the same for all the particles of material.

In the apparatus according to the invention, this main steeping zone is adjoined by an after-steeping zone in which the steeped material remains for a certain period before entering the crushing mill. In its most simple embodiment, this after-steeping zone is formed by a shaft-like space between the storage container (malt barrel) and the crushing mill. As will be explained in more detail with reference to an exemplary embodiment, additional means for the removal of adhering water may be provided at the lower end of this after-steeping zone.

According to the invention, it may also be of advantage to lengthen the steeping time by arranging a pre-steeping zone in the lower part of the malt barrel, ahead of the above-mentioned main steeping zone.

BRIEF DESCRIPTION OF THE DRAWINGS

FIG. 2 is a plan view of a drainage sieve for the steeping water, of the type used in the apparatus shown in FIG. 1.

FIG. 3 is a vertical section identical with that shown in FIG. 1 (but only through the upper part of the apparatus, to illustrate the pre-steeping zone).

DESCRIPTION OF THE PREFERRED EMBODIMENT

Figure 1:
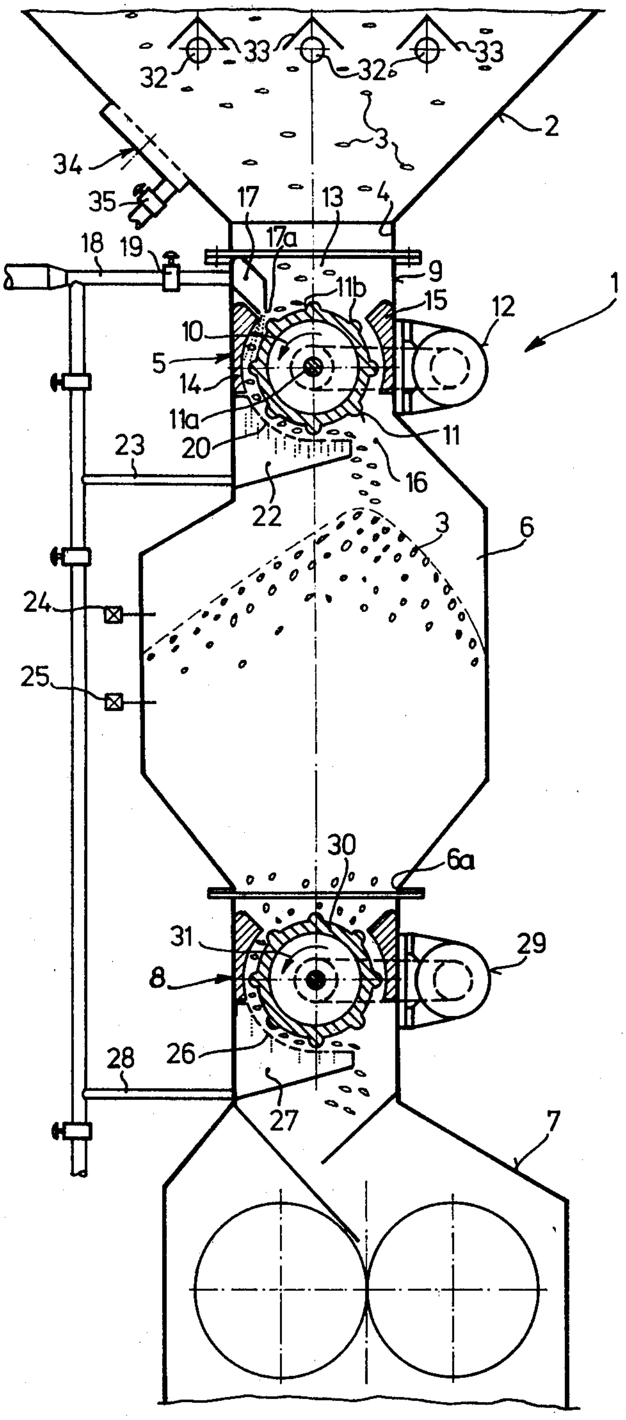
FIG. 1 is a diagrammatic vertical section of a wet crushing apparatus according to the invention.

The wet crushing apparatus 1 shown in FIG. 1 includes a storage container or so-called malt barrel 2 for the material 3 to be crushed. In the interest of simplicity, only the lower funnel-shaped end of this malt barrel 2 has been shown. A rotary feeder 5 is connected (for example flanged, as shown) to the lower outlet opening 4 of the malt barrel 2, forming the lower closure of the malt barrel 2. The rotary feeder 5 is adjoined underneath by a steeping vessel 6 which forms an after-steeping zone. Beneath the steeping vessel 6 is a conventional wet crushing mill 7 with which is associated a feed roller 8 which forms the lower closure of the steeping vessel 6, i.e. at its outlet opening *6a*. In addition, the wet crushing apparatus 1 comprises means for the delivery and removal of steeping water for the material to be crushed, as will be explained in detail hereinafter.

The rotary feeder 5 extends with its housing 9 perpendicular to the plane of the drawing in FIGS. 1 and 3, the bucket wheel 11, rotating in the direction of the arrow 10, being rotatably mounted in the end walls (not shown) of the lock housing 9 and being driven by an infinitely variable-speed drive 12. The rotary feeder 5 further comprises over its entire axial length an upper inlet opening 13 facing the outlet opening 4 of the malt barrel, peripheral wall sections 14, 15 on both longitudinal sides and a lower outlet opening 16. Situated above the bucket wheel 11, inside the lock housing 9 and between the inlet opening 13 and the peripheral wall section 14 (which is situated in the region of the downwardly rotating peripheral portion of the bucket wheel) there is a feed pocket 17 for steeping water which extends over the entire axial length of the bucket wheel 11, and which over its entire length comprises a water outlet slot 17*a* extending parallel to the bucket wheel shaft 11*a*. This steeping-water feed pocket 17 is connected to a water delivery pipe 18 having a valve 19 to control the flow of water.

Below the bucket wheel 11 inside the lock housing 9, i.e. in the lower peripheral region of the rotary feeder, there is a fixedly arranged drainage sieve 20 for steeping water, which extends over the entire axial length of the bucket wheel 11 and over the peripheral region of the bucket wheel 11 lying between the peripheral wall section 14 and the outlet opening 16. The drainage sieve 20, which is shown separately in plan view in FIG. 2, comprises slots 21 as openings which, in the interest of clarity, are merely shown as dashes in the drawing. These slots 21 are arranged in the sieve 20 in such a way that they run parallel to axis of the shaft 11*a* (indicated in dash-dot lines in FIG. 2) of the bucket wheel 11. Below the drainage sieve 20 there is a water drainage compartment 22 to which a discharge pipe 23 is connected.

A maximum level sensor 24 and a minimum level sensor 25 are provided in one of the side walls of the steeping vessel 6, to control the passage of material through the steeping vessel, as will explained hereinafter.

The feed roller 8 for the crushing mill 7 may be constructed in any suitable manner. However, it is preferable for the feed roller 8 to be constructed in exactly the same way as the rotary feeder 5, but without the feed pocket 17 for the steeping water that is provided in the rotary feeder 5. The water drainage sieve 26 provided in the lower peripheral region of the feed roller 8 forms a secondary separation facility for steeping water which is removed from the water drainage compartment 27 by means of a discharge pipe 28. An infinitely variable-speed drive 29 is also associated with the feed roller 8, to drive a metering roller 30 in the form of a bucket wheel in the direction of the arrow 31. The variable-speed drives 12 and 29 of the rotary feeder 5 and the feed roller 8, respectively, may be controlled by means of a control system (not shown) via the level sensors 24 and 25 of the steeping vessel 6, or via other control elements.

As also illustrated in FIG. 1, the discharge pipes 23 and 28 of the rotary feeder 5 and feed roller 8, respectively, may be additionally connected through pipes and valves to the water delivery pipe 18 so that the water drainage sieves 20 and 26 may occasionally be back-washed for cleaning purposes.

In addition, the wet crushing apparatus 1 described above may comprise a pre-steeping zone which is arranged ahead of the main steeping zone formed by the periphery of the rotary feeder 5 and which is formed by the lower part of the malt barrel 2 (storage container). In this case, water sprinklers formed by several water spray tubes 32, above which roof-like deflectors 33 may be arranged, are provided in this lower funnel-shaped part of the malt barrel 2, as shown in FIGS. 1 and 3. With an arrangement such as this, however, it is best to provide a safety overflow 34 connected to a closeable discharge pipe 35 in one of the side walls of the lower funnel-shaped part of the malt barrel 2.

The steeping operation in the apparatus 1 is illustrated by the following two Examples:

EXAMPLE 1

Normal malt is to be steeped and then crushed.

The malt passes from the malt barrel 2 into the rotary feeder 5, in which the required quantity of steeping water is added to the malt above the bucket wheel 11 through the feed pocket 17 via its slot 17*a*. In the compartments 11*b* of the bucket wheel, the malt together with the steeping water initially passes through the main steeping zone in the region of the peripheral wall section 14, to the drainage sieve 20. In the region of the drainage sieve 20, the main steeping water is drained off and is able to flow off through the discharge pipe 23, whilst the steeped malt, which now contains only the adhering water, passes into the after-steeping zone in the steeping vessel 6. The steeped malt remains in this after-steeping zone (steeping vessel 6) for an exactly definable period, so that the adhering water is able to penetrate into the glume and make it so flexible that it remains almost completely intact after crushing. The residence time in the steeping vessel 6 may be controlled by means of the level sensors 24 and 25 and, together therewith or independently thereof, by means of the variable drives 12, 29 of the rotary feeder 5 and feed roller 8, respectively. Since the fully steeped malt is delivered from the steeping vessel 6 to the rollers of the crushing mill via the feed roller 8, it also passes the water drainage sieve 26 of this feed roller 8 so that any steeping water entrained or still present may be separated off before the crushing operation.

EXAMPLE 2

Barley and/or poorly dissolved malt is steeped as the material to be crushed. Starting material of this type does not take up the steeping water as readily as normal malt in the region of the glume; in other words it requires a longer residence time in the steeping water. In this case, the water spray tubes 32 provided in the lower part of the malt barrel 2 are additionally switched on, as indicated in FIG. 3, resulting in the formation in the lower part of the malt barrel 2 of a pre-steeping zone 36 in which pre-steeping water is added to the material in a measured, uniform distribution. If too much pre-steeping water should collect in this pre-steeping zone, it is possible to run off surplus pre-steeping water through the overflow 34. The material wetted and pre-steeped in the pre-steeping zone 36 passes to the rotary feeder 5 where the same main steeping operation as described in Example 1 takes place.

Accordingly, by means of the apparatus 1 described above and illustrated in the drawings, the steeping operation (with or without pre-steeping) may be carried out very favourably and may advantageously be influenced within wide limits both in regard to the amount of water added and in regard to the residence time. At the same time, the steeping and subsequent crushing of the material may be carried out continuously, which is particularly favourable.

I claim:

1. Apparatus for supplying material to a wet-crushing mill, comprising a storage container for the material, having a bottom outlet, and a rotary feeder which (a) is arranged below the storage container, (b) has a top inlet joined to such bottom outlet, (c) forms a bottom closure for the container, (d) has peripheral wall sections on two opposite sides of the feeder and (e) has a bottom outlet, a drainage sieve to separate steeping water from the material being fixedly arranged between the latter bottom outlet and a peripheral wall section which is adjacent to the downward-traveling peripheral portion of the rotary feeder, at least one device for delivering steeping water to the material being arranged above the rotary feeder, and an after-steeping vessel being arranged below the feeder to receive material therefrom.

2. Apparatus as claimed in claim 1 wherein the rotary feeder comprises a bucket wheel mounted on an axle, a housing surrounding the bucket wheel, a feed pocket arranged in the housing between the top inlet and the peripheral wall section that is adjacent to the downward traveling portion of the bucket wheel, and arranged parallel to the axle, having an outlet slot extending throughout the length of the feed pocket, and having a pipe connection for directing water into the feed pocket.

3. Apparatus as claimed in claim 1 wherein the drainage sieve extends throughout the length of the bucket wheel and comprises slots extending parallel to the axle of the bucket wheel.

4. Apparatus as claimed in claim 1 wherein a water drainage compartment is provided below the drainage sieve and is connected to a discharge pipe.

5. Apparatus as claimed in claim 1 wherein sensors for maximum and minimum levels are provided in the after-steeping vessel.

6. Apparatus as claimed in claim 5 wherein a feed roller for a crushing mill is arranged to form a bottom closure for the after steeping vessel.

7. Apparatus as claimed in claim 6 wherein both the rotary feeder and the feed roller are provided with variable-speed drives.

8. Apparatus as claimed in claim 7 wherein the variable speed drives are controlled by the level sensors.

9. Apparatus as claimed in claim 6 wherein the rotary feeder and feed roller are constructed alike except that the feed roller has no water feed pocket.

10. Apparatus as claimed in claim 9 wherein the water drainage compartments of the rotary feeder and feed roller are connected to a water supply pipe to provide water under pressure for back-flushing the sieves.

11. Apparatus as claimed in claim 1 wherein water sprinklers are arranged in the lower portion of the storage container.

12. Apparatus as claimed in claim 11 wherein a water overflow outlet is provided in a side wall in the lower portion of the storage container.

* * * * *